United States Patent
Bareggi et al.

[11] Patent Number: 5,886,246
[45] Date of Patent: Mar. 23, 1999

[54] TEST METHOD AND DEVICE FOR SCREWERS

[75] Inventors: Luigi Bareggi, Noviglio; Angelo Chiapuzzi, Milan, both of Italy

[73] Assignee: BLM S.a.s. di L. Bareggi & Co., Milan, Italy

[21] Appl. No.: 891,828

[22] Filed: Jul. 14, 1997

[30] Foreign Application Priority Data

Jul. 15, 1996 [IT] Italy .................................. MI96A1459

[51] Int. Cl.⁶ .................................................. G01N 19/00
[52] U.S. Cl. .......................... 73/1.09; 73/865.9; 73/1.12
[58] Field of Search .................... 73/1.12, 1.09, 73/1.11, 761, 865.9

[56] References Cited

U.S. PATENT DOCUMENTS

| | | | |
|---|---|---|---|
| 3,754,437 | 8/1973 | Kanabel et al. | 73/811 |
| 3,962,910 | 6/1976 | Spyridakis et al. | 73/761 |
| 4,150,559 | 4/1979 | Levy | 73/1.12 |

FOREIGN PATENT DOCUMENTS

| | | | |
|---|---|---|---|
| 711360 | 1/1980 | U.S.S.R. | 73/1.12 |
| 3305457C2 | 7/1991 | United Kingdom . | |

*Primary Examiner*—Hezron Williams
*Assistant Examiner*—Nashmiya Fayyaz
*Attorney, Agent, or Firm*—Evernson, McKeown, Edwards & Lenahan, P.L.L.C.

[57] ABSTRACT

A test method for a screwer performs the steps of connecting the screwer to a rotatable attachment element, screwing down the screwer, measuring the attachment element speed, power-supplying an electric motor to bring it to a speed close to the measured speed, connecting the shaft of the electric motor to the attachment element, and causing the motor to follow a braking ramp while the torque transmitted from the screwer to the driving shaft is measured. A device in accordance with this method includes a rotatable attachment element to which the screwer to be tested is applied, and an electric motor connected to the attachment element through a releasable coupling connecting the motor to the attachment element on achievement of a motor speed close to that of the attachment element. The motor is controlled for following a braking ramp based on a predetermined law, while a transducer measures the transmitted torque between the attachment element and braking element.

13 Claims, 2 Drawing Sheets

Tav. I

Tav. II

TEST METHOD AND DEVICE FOR SCREWERS

BACKGROUND OF THE INVENTION

The present invention relates to a test method for screwers and to devices applying this method. Powered screwers (of the electromechanical, pneumatic and other types) must give a precise torque wrench setting in use.

Therefore, availability of test devices is required which enable periodical checking of the torque wrench setting expressed by a screwer, so as to be able to establish whether adjustment, repair or replacement of those screwers that are no longer in conformity with specifications is required.

Precise standards exist giving regulations for measurement of screwer performances. For example, standard ISO 5393-81 describes a test method for evaluating pneumatic screwer performances and provides instructions on the statistical evaluation of measurements.

Obviously, since in normal use a screwer torque increases during rotation, any test for torque performances in a screwer must be conducted using simulators having a controlled torque gradient, so as to simulate the actual screwing down of a screw and enable the torque supplied by the screwer under a significant condition to be measured. For example, standard ISO 5393 presently requires that the tool should be tested under two limit conditions, in which the torque increase of 50% to 100% of the rated torque develops through a rotation of 360° and 30° respectively. In these value ranges (that in any case can be subjected to variations), standards ISO impose that the torque opposed by the simulator should increase according to a substantially linear law relative to rotation.

Simulators of the simplest conception are mere mechanical joint simulators. However, since the screwer calibration can be set to a variety of values, theoretically a variety of simulators should be provided or the simulator features should be susceptible of variation, which is generally rather complicated: therefore, mechanical simulators apply to the cases in which averaged out conditions are acceptable, but they do not exactly reflect features required by standards. In addition, the use of mechanical joint simulators has the drawback of requiring the screw to be unscrewed after each calibration so that a new test may be carried out.

In order to obviate the above drawbacks, as described in DE 33 05 457, test systems have been accomplished that use electromagnetic brakes of different types to simulate the torque-angle relationships required by standard ISO, by means of a modulation of the feed current to the brake coil.

The main defect in these systems is due to the fact that braking takes place by friction elements that, owing to their own nature, undergo feature variations as a result of heating and wear of the friction surfaces. Therefore a constant reliability overtime cannot be ensured.

In order to obviate the above inconvenience, the use of braking devices that do not operate by friction has been also mentioned, such as in the case in which current generators driven in rotation by the screwer are employed, which generators generally do not have appropriate electromechanical features.

In any case, there is a defect which is common to all the above devices, both those provided with traditional brakes and those involving current generators, i.e. the high moment of inertia of the braking unit which can be too high for quick screwers when calibrated to a low torque. In this case, the test cannot be carried out in that the static torque for driving the system in rotation exceeds the maximum torque for which the screwer is calibrated, so that the latter disconnects.

The general object of the present invention is to eliminate the above mentioned drawbacks by providing a test method and devices for screwers enabling specifications of the international standards to be accurately followed and constant results to be achieved even when screwers having particular features of low torque and/or high speed are concerned.

SUMMARY OF THE INVENTION

In view of the above object, in accordance with the invention, a test method for a screwer has been devised which comprises the steps of connecting the screwer to a rotatable attachment element, screwing down the screwer, measuring the attachment element speed, power-supplying an electric motor to bring it to a speed close to said measured speed, connecting the shaft of the electric motor to the attachment element, causing the motor to follow a braking ramp while the torque transmitted from the screwer to the driving shaft is measured.

To apply the above method, a test device for a screwer has been also conceived which comprises a rotatable attachment element to which the screwer to be tested is applied, a braking element connected to the attachment element for its controlled braking according to a predetermined law and torque measuring means connected for measurement of the transmitted torque between the attachment element and braking element, characterized in that the braking element is an electric motor connected to the attachment element by releasable coupling means connecting the motor to the attachment element upon achieving a motor speed close to that of the attachment element.

BRIEF DESCRIPTION OF THE DRAWINGS

For better explaining the innovative principles of the present invention and the advantages it offers as compared to the known art, possible embodiments applying these principles will be described hereinafter by way of non-limiting example, with reference to the accompanying drawings, in which.

DETAILED DESCRIPTION OF THE INVENTION

Figure 1:
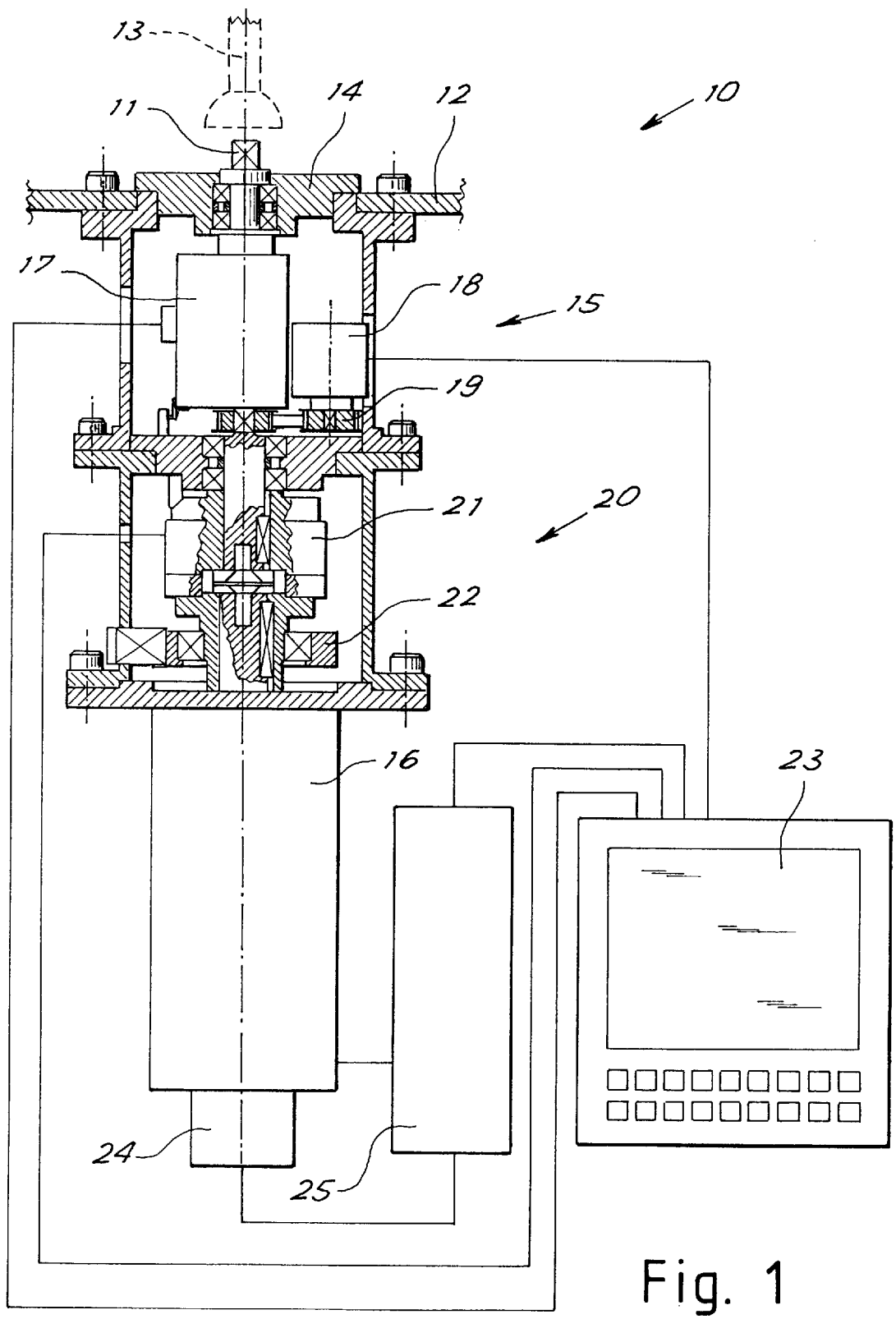
FIG. 1 is a diagrammatic view partly in section of a first embodiment of a test device in accordance with the invention.

With reference to the drawings, shown in FIG. 1 is a test device, generally identified by 10, comprising a rotatable attachment element 11 jutting out of the plane 12 of a test bed the remaining part of which is not shown. The attachment element 11 is intended for coupling with the head of a screwer 13 to be tested and therefore will have a known shape adapted to the particular screwer. For instance, in the drawings the attachment element 11 is shown as a square male clutch, but it can take any other, male or female, polygonal or different shape. The attachment element may be detachable from a chuck 14, so that it can be easily replaced.

Below the bed plane, the attachment element 11 is connected by measurement means 15 and drive clutch means 20, to an electric motor 16 which can be an asynchronous motor for example, advantageously a motor of the so-called brushless type.

The measurement means 15 comprises a known rotating torque transducer 17, for measurement of the torque transmitted between the motor 16 and attachment element 11 (and consequently the screwer) and an encoder 18 for measurement of the angular rotation of the attachment element and its rotation speed. Encoder 18 can be a separate element connected to, as shown in the figure through belts and pulleys 19, or integrated into, the torque transducer. The clutch means 20, disposed between the measurement unit comprising the encoder and motor, is of known type which is operable for drivingly connecting and disconnecting the driving shaft to and from the attachment element 11 in the form of the clutch 11. For example, use of a known electromagnetic clutch provided with teeth, a so-called claw clutch 21 has been found advantageous, so as to have a reduced moment of inertia, for example relative to a friction clutch of same transmissible torque. The possibility of using a claw clutch arises from the particular operation of the test device in accordance with the invention, as described in the following.

An electronic control system 23, a computerized system for example, substantially belonging to the known art, receives signals from the torque sensor, the encoder and a speed sensor or resolver 24 of motor 16, and outputs drive signals for the clutch device 20 and, through a known appropriate power device 25, for motor 16, as better described later. The device 23 may comprise a display screen and a keyboard to display information about the test course and receive commands from the operator. In use, first the clutch means 20 is uncoupled and motor 16 is therefore disconnected from the attachment element 11. The operator fits a screwer to be tested into the attachment element 11 and starts it. The mass in rotation connected to the attachment element 11 is at present very low and to such an extent that it produces a static torque lower than the torque for which the screwer is adjusted. The screwer substantially rotates freely and therefore at full speed. The encoder 18 measures the rotation speed of the screwer and transmits the information to the control system 23 that, in turn, starts rotation of motor 16 until it brings it to a speed close to the screwer's (with a difference not exceeding 5% for example) and in any case to such a speed that the screwer does not exceed the torque for which it is set, when it is connected to the motor. Advantageously, the motor speed (measured by sensor 24) can be brought to be the same as the screwer speed, so that the claw clutch can be operated without slippage to make the motor and screwer integral with each other through the torque transducer 17.

At this point the system powers the motor to supply a predetermined braking ramp, in order to follow the already mentioned test standards for screwers, for example.

As is obvious for a person skilled in the art, the braking ramp can be easily accomplished so as to produce a linear relationship between the generated torque and angular rotation of the screwer head, as prescribed by standards ISO.

For this purpose, the braking ramp can be practically expressed as torque-time. To do this, it is necessary to carry out a first identification test of the torque-time feature for the particular screwer. During this step, the encoder 18 is used to measure the torque-angle ratio corresponding to a given set time so that a braking adjusted against time and taking place at the desired angle can then be obtained. The system 23 will store the obtained curve, associating it with the particular screwer.

After that, it is possible to carry out the true test as described above, both immediately and after a period of time, on which occasion the system will provide the motor with a characteristic braking curve based on the torque-time ratio of the particular screwer and capable of maintaining the torque-angle ratio linear.

In other words, the braking ramp is carried out with a torque gradient controlled in time, based on previously established parameters during mapping of the screwer features, that have been stored in the system and are used for that specific screwer. During the braking test step measurement of torque against angle takes place instant by instant so as to detect the predetermined characteristic curve.

In the case of tests spaced in time the system will be therefore capable of determining whether the characteristic torque-time curve of that screwer has undergone variations relative to the desired torque-angle curve and, should not the braking angle be the desired one, it will automatically vary the ramp against time in order to restore the desired conditions. At the end of the test the system will then be able to signal the screwer correspondence to the starting specifications.

The braking ramp can also be expressed in torque-angle, the starting test being eliminated while the test is directly executed with the torque sensor and encoder supplying feedback for drive of the motor braking in order to keep the relationship between torque and rotation angle linear, thereby applying the test method provided in standards ISO5393 to the letter.

Either in the case of the braking ramp expressed in torque-time, or in the case of a braking ramp expressed in torque-angle, the test result is in any case in conformity is with the prescribed regulations.

At the end of the test, the clutch 20 disconnects the motor from the screwer and the system is ready for the next test.

Obviously, the control system can process the test outcome or the outcome of several tests, and supply statistical results, graphs, etc., as a person skilled in the art can easily conceive.

In the use of an electric motor as the braking element a practical problem may arise. Actually, rotation of the motor used as a brake can become unstable close to a zero speed. In other words, the motor could tend to oscillate about the zero speed, continuously reverting its running until it is completely stationary. The torque-time (or torque-angle) graph therefore should no longer be linear close to the stop point (i.e. the point of maximum torque).

In order to solve the above problem in a simple manner, advantageously inserted between the motor and clutch 21 is a freewheel device 22 enabling rotation of the driving shaft only in one direction (the direction concordant with the normal screwer rotation) and acting as a non-return device in the opposite rotation direction.

Thus it is possible to supply a braking ramp having a torque greatly higher than that supplied by the screwer, thereby obtaining a linear course until stopping. The torque surplus exceeding that required for stopping the screwer is absorbed by the freewheel, which prevents the motor rotation in the opposite direction due to the torque surplus. The freewheel also has an accident-prevention function, avoiding the reverse rotation of the motor and therefore preventing the motor from driving the whole screwer in the contrary direction.

Figure 2:
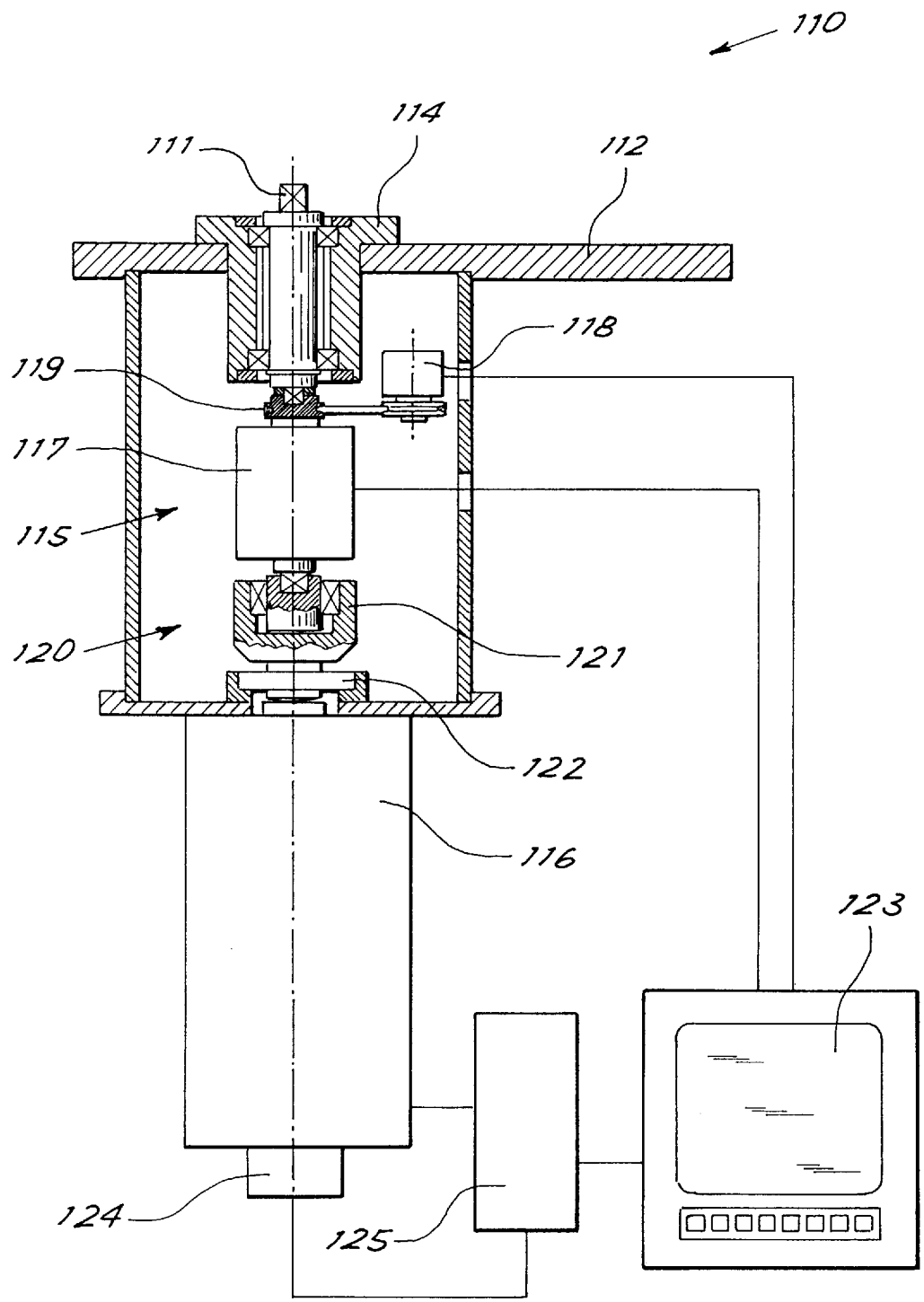
FIG. 2 is a view, similar to that shown in FIG. 1, of a second embodiment applying the inventive principles.

For explaining the principles of the invention in a still clearer manner, a second embodiment of a test device applying these principles will be now described with reference to FIG. 2.

Elements similar to those of the embodiment in FIG. 1 in terms of structure or function will be hereinafter denoted by same reference numerals used in FIG. 1 increased by one hundred.

Therefore, there is a test device generally denoted by 110, comprising a clutch attachment element 111 jutting out of the plane 112 of a test bed and adapted for engagement with the head of a screwer to be tested. The attachment element is detachable from a chuck 114 so that it can be replaced with ease.

Below the bed plane, the attachment element 111 is connected, through measurement means 115 and clutch means 120 disposed in series, to an electric motor 116 that can be an asynchronous motor for example, advantageously a motor of the so-called brushless type.

The measurement means 115 comprises a known rotating torque transducer 117 for measurement of the torque transmitted between the motor 116 and the attachment element 111 and an encoder 118 connected to the attachment element through a drive 119, for measurement of the angular rotation and rotation speed of the attachment element. Alternatively, the encoder can be integrated into a torque meter.

Unlike the embodiment in FIG. 1, the clutch means 120 consists of a mere freewheel device 121, of a size adapted to transmit the maximum required torque, keyed onto the motor shaft to disconnect it from the attachment element 111 when the rotation speed of the motor is higher than the clutch speed.

An electronic control system 123, a computerized system for example, substantially belonging to the known art, receives signals from the torque sensor, the encoder and a speed sensor or resolver 124 of motor 116 and, through an appropriate known power device 125, operates motor 116 as explained in the following. The device 123 may comprise a display screen and a keyboard to display information about the test course and receive commands from the operator. Also present on the motor shaft is a second freewheel 122 connecting the motor shaft to the device framework to provide the same effects as described for the freewheel 22.

During operation of the device, motor 116 is first set in rotation at a higher speed than that of the maximum speed of the screwer to be tested (typically 2000 revolutions per minute). For example, a single speed higher than the fastest screwer that is likely to be tested may be selected. Under these conditions, the attachment element 111 does not rotate by virtue of the action of the freewheel 121.

At this point, the screwer can be connected to the attachment element 111 and operated. The freewheel is still uncoupled because the idling speed of the screwer is surely lower than that of motor 116.

The encoder 118 measures the rotation speed of the screwer and transmits the information to system 123 which, in turn, carries out decreasing of the rotation speed of motor 116 until a speed slightly higher than the screwer's (not exceeding the screwer speed by no more than 3–5%, for example) is reached Once this condition has been achieved, the system powers the motor so that it can have a braking ramp as already described in the preceding embodiment. During braking the freewheel 121 follows a rotation direction contrary to the starting direction, so that it makes the motor 116 and clutch 111 integral with each other through the torque transducer 117.

At the end of the test cycle the motor rotates again to the starting high speed, releasing the freewheel 121 and thus making the device ready for the subsequent test.

By virtue of the use of a freewheel, instead of a controlled clutch as in the previous embodiment, the moment of inertia weighing on the attachment element 111 before fitting of the clutch means 120 is further reduced.

The second embodiment can be therefore advantageously employed for testing screwers at low torque and high number of revolutions (typically in the range of 0.5–10 Nm with a speed higher than 1500 revolutions/minute).

At this point it is apparent that the intended purposes have been achieved. By the described method of starting in advance a motor adapted for a controlled braking action, to bring it to a speed close to the idling speed of the screwer, and only subsequently fitting the screwer thereon, tests on screwers with which a surplus moment of inertia could prevent starting in rotation of the screwer is also possible without any problem.

It is to note that braking takes place without mechanical friction and therefore without wear, therefore ensuring a prolonged duration of its useful lifetime, in addition to measurement accuracy and repeatability. Obviously, the above description of embodiments applying the innovative principles of the present invention is given by way of example only and must not be considered as a limitation of the scope of the invention rights as herein claimed.

For instance, the exact mechanical structure and sizes of the different elements of the test device will vary depending on the practical specific requirements. The clutch means between the motor and screwer can be made differently from those shown and be operated electrically, pneumatically, etc. The rotation speed meter of the attachment element can be different from an encoder having a suitably processed signal. The angle sensor and speed sensor can also be two separate devices, as is obvious to a technician. In addition, the torque transducer too can be made by adopting other known means and be differently positioned.

What is claimed is:

1. A test method for a screwer comprising the steps of:
   connecting the screwer to a rotatable attachment element;
   powering the screwer to rotate the attachment element;
   measuring the attachment element speed;
   power-supplying an electric motor to bring the electric motor to a speed close to said measured speed of the attachment element;
   connecting a driving shaft of the electric motor to the attachment element;
   causing the motor to follow a braking ramp while the torque transmitted from the screwer to the driving shaft is measured.

2. A method as claimed in claim 1, wherein the braking ramp is controlled to have a linear torque variation against a rotation angle of the screwer.

3. A method as claimed in claim 2, wherein the braking ramp is carried out with a time-controlled torque gradient, based on a predetermined characteristic torque-time curve against a desired braking angle for a particular screwer being tested.

4. A method as claimed in claim 2, wherein also the rotation angle of the screwer is measured and the braking ramp is varied for keeping the relation between the measured torque and measured angle linear.

5. A test device for a screwer comprising a rotatable attachment element to which the screwer to be tested is applied, a braking element connected to the attachment element, which attachment element undergoes controlled braking according to a predetermined law and torque measuring means connected for measurement of the transmitted torque between the attachment element and braking element, wherein the braking element is an electric motor connected to the attachment element by releasable coupling means connecting the motor to the attachment element upon achieving a motor speed close to that of the attachment element.

6. A device according to claim 5, further comprising a speed sensor connected to the attachment element to detect the speed of the attachment element, a control device for the motor which receives speed signals from the sensor and powers the motor to bring the motor to said speed close to that of the attachment element.

7. A device according to claim 5, further comprising a sensor for measuring the angular rotation of the attachment element.

8. A device according to claim 5, wherein the torque measuring means comprises a torque transducer disposed between the attachment element and releasable means.

9. A device according to claim 5, wherein the releasable means comprises a freewheel mechanism disposed between the attachment element and a motor shaft of the motor.

10. A device according to claim 6, wherein the releasable means comprises a fitting joint electrically operated by the control device for fitting between a driving shaft of the motor and the attachment element.

11. A device according to claim 10, wherein the fitting joint is an electromagnetic claw clutch.

12. A device according to claim 5, wherein a freewheel is present on a driving shaft of the motor for preventing the driving shaft from rotating in a direction contrary to a normal rotation of the attachment element.

13. A device according to claim 5, wherein the motor is a brushless motor.

* * * * *